2,946,189

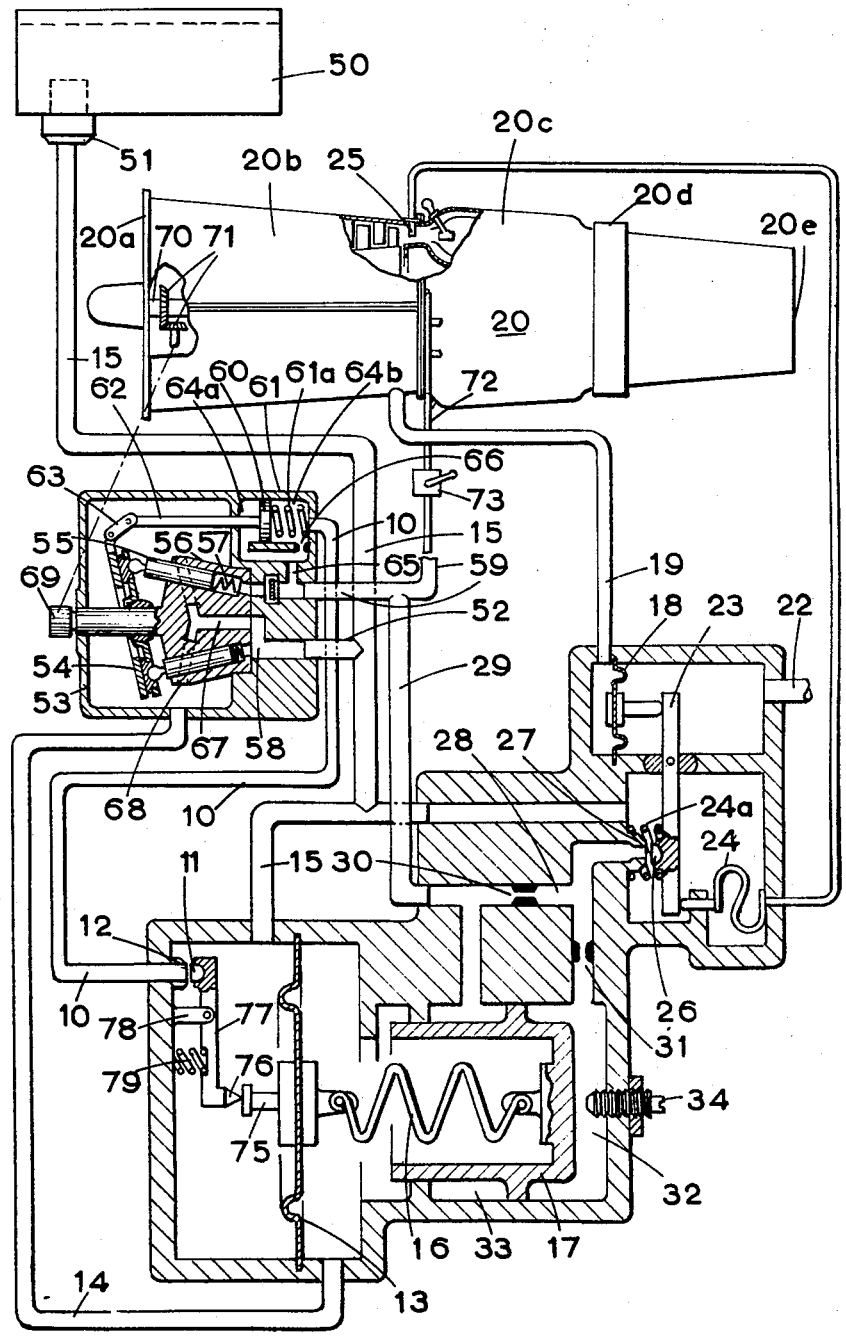

FUEL SYSTEMS OF GAS-TURBINE ENGINES

Kenneth Arnold Basford, Alvaston, England, assignor to Rolls-Royce Limited, a British company Filed June 30, 1955, Ser. No. 519,197

Claims priority, application Great Britain July 14, 1954

7 Claims. (Cl. 60—39.28)

This invention relates to fuel systems of gas-turbine engines and seeks to provide speed governor means arranged to control the engine in a desirable manner.

According to the present invention, in a fuel system of a gas-turbine engine including speed governor means arranged to prevent the speed of the engine exceeding a preselected maximum value, said speed governor means comprises a pressure-sensitive device subjected to the delivery pressure of the compressor system of the engine or a function thereof and additional means sensitive to the delivery temperature of the compressor system or a function thereof, whereby the governor means is operative to control the engine to avoid a preselected rotational speed being exceeded, which speed is both a function of the delivery pressure and delivery temperature of the compressor system.

One preferred application of the invention is to high-performance gas-turbine engines designed for aircraft propulsion, where the desirability of low engine weight necessitates the use of light alloy materials in the compressor system of the engine. Such materials are known to have a "creep life" which is dependent upon the stress applied to the part and additionally dependent upon the temperature at which the part operates. Thus, in applying the present invention to gas-turbine engines of this kind it is arranged that the speed governor means is effective to prevent the speed of the engine exceeding a preselected value which is a function both of the delivery pressure and temperature of the compressor system, whereby the creep life of a part of the compressor system, e.g. a compressor casing casting, will not be exceeded in the normal operating life of the engine.

Preferably the invention is applied to fuel systems for gas-turbine engines of the well-known kind in which a variable-capacity pump, e.g. a swash-plate type pump, includes fluid pressure servo means controlling the angularity of the swash-plate. Hitherto it has been the common practice to provide a pressure-sensitive device, e.g. a diaphragm, subjected to a fluid pressure which is a function of the actual rotational speed of the engine (N), said diaphragm being loaded by means of a spring. The arrangement is such that when a certain preselected value of the engine rotational speed (N) is reached the diaphragm moves to actuate valve means controlling the fluid pressure of the pump servo system, thereby to reduce fuel delivery of the pump.

In applying the present invention to this well-known system the spring loading the diaphragm or equivalent has its loading varied by means of a piston device to which it is connected at one end, said piston device being movable by a fluid pressure servo system controlled by valve means actuated by a pressure-sensitive device subjected to the compressor delivery pressure or a function thereof and additionally by temperature-responsive means sensitive to the delivery temperature of the compressor system or a function thereof.

Such an embodiment of the invention is illustrated diagrammatically in the accompanying drawing which shows a gas-turbine engine and part of the associated fuel system.

The gas turbine engine is indicated generally at 20 and consists of a compressor 20b receiving air from the atmosphere via intake 20a and delivering air in the compressed state to combustion equipment 20c wherein it has fuel burnt in it. The products of combustion pass to a turbine 20d, the rotor of which drives the compressor, and, after leaving the turbine, the exhaust gases pass to atmosphere at high velocity through propelling nozzle 20e, thus producing a propulsive thrust on the engine.

The fuel system is basically of a well known kind and includes a fuel tank 50 delivering fuel through a booster pump 51 and pipes 15 and 52 to a variable capacity type pump 53 of the swash plate type driven from the engine. The pump comprises a swash plate 54 the angularity of which controls the stroke of pump plungers 55 mounted in the pump rotor 56 and caused to reciprocate by the swash plate in cooperation with springs 57 to draw in fuel through inlet duct 58 in the pump casing and pump it out through delivery duct 59.

A piston 60 in a cylinder 61 is connected by rod 62 and link 63 to vary the angularity of the swash plate 54 and is urged to the left by spring 61a.

The space 64a to the left of piston 60 is in communication with the delivery of the pump through a duct 65. The space 64b at the right hand end is in communication with the delivery of the pump through duct 65 and restriction 66, and fuel is bled from this space in a controlled manner through pipe 10.

It will be appreciated that when the restriction to flow through pipe 10 is decreased, pressure in space 64a will tend to overcome the spring 61a and move piston 60 to the right, thus reducing the angularity of the swash plate and the delivery of the pump.

When the restriction to flow through pipe 10 is increased, pressure will build up in the space 64b, and this pressure and the load of spring 61a will accordingly tend to move the piston to the left and increase the angularity of the swash plate and thus increase the delivery from the pump.

The pump rotor 56 also functions as a centrifugal impeller by reason of an axial bore 67 in register with the inlet duct 58 of the pump and radial passages 68 leading out of bore 67.

Rotation of the pump rotor will thus create a pressure inside the casing of pump 53 which will be a function of the speed of rotation of the pump, and therefore of the engine.

The pump rotor 56 is driven through a pinion 69 from the centre shaft 70 of the engine through inter-engaging bevel pinions 71. The pump delivers through conduit 59 into a fuel control device 73 and then through duct 72 to the combustion equipment 20c of the engine.

The pressure in the casing of pump 53 is communicated by a pipe 14 to one side of a diaphragm 13, the other side of which is in communication with the inlet of the pump through the pipe 15.

The diaphragm 13 carries a diaphragm rod 75 which bears on a point 76 of a lever 77 pivoted on a bracket 78 and carrying at its other end a half-ball valve 11 urged on to its seating at the end of pipe 10 by a spring 79.

The diaphragm 13 is loaded by a tension spring 16 and the parts function so that when the rotational speed (N) of the engine exceeds a predetermined value the pressure created by the passages 68 in the pump rotor 56 communicated by pipe 14 to the right hand side of diaphragm 13, overcomes spring 16 whereby the diaphragm moves to the left raising valve 11 from its seating.

The parts of the drawing so far described illustrate the workings of a known form of fuel supply and governor system. In that system the right hand end of spring 16 has a fixed anchorage.

In modifying that system in accordance with a preferred embodiment of the present invention the spring 16 is anchored to a movable piston 17 whereby the position of the piston 17 determines the loading of the spring.

The adjustment of the piston 17 is controlled in the following manner:

A pressure-sensitive diaphragm 18 is subjected through connection 19 to the delivery pressure of the compressor system 20b of the gas-turbine engine generally indicated at 20. The diaphragm 18 is subjected at its other side to atmospheric pressure through vent 22. The diaphragm 18 applies a load to a pivoted beam 23 which is also loaded in the same sense by a Bourdon tube 24 connected to a temperature bulb 25 in the compressor delivery duct. The combined loads are opposed by spring 24A. Alternatively the bulb may be located in a pocket in the compressor casing having good thermal connection therewith whereby it senses the temperature of the compressor casing structure. It will be appreciated that the pressure loading on diaphragm 18 and the temperature loading applied through Bourdon tube 24 tend to close servo valve 26 on to its seating 27. This valve controls the flow of servo pressure fluid from duct 28 which pressure fluid is derived from the high-pressure delivery of the fuel pump through connections 59 and 29 and restrictor 30, there being an additional restrictor 31 between the duct 28 and cylinder space 32 within which the piston 17 operates.

It will be noted that if the valve 26 is closed pressure will build up in space 32 to equal that in space 33 and piston 17 will move to the left due to the preponderant piston area in space 32 thereby decreasing the load imposed on the diaphragm 13 by spring 16. If valve 26 opens, the leakage of servo liquid from space 32 permits the piston 17 to move to the right under the load imposed by high-pressure servo liquid operating in the annular cylinder space 33. In this manner the loading imposed by the spring 16 is increased. The amount of movement permitted is limited by an adjustable stop screw 34.

In the application of gas-turbine engines to aircraft propulsion the operation of the engine more particularly at low altitude may give rise to undesirably high pressure and temperature conditions in the compressor system of the engine, bearing in mind the limitations on creep life imposed by materials used in the compressor, e.g., for the compressor casing structure or outlet duct therefrom. Thus in the system described the normal top speed governor dependent upon the actual rotational speed (N) of the engine will be operative except when a preselected value of a function both of compressor delivery pressure and temperature is reached. This value of the function is sensed by the loads applied to the pivoted beam 23 by the diaphragm 18 and Bourdon tube 24 against the loading spring 24A. When the loading of the spring 24A is overcome and the valve 26 closes, the piston 17 moves to the left thereby reducing the basic setting of the speed governor. The system thus operates to prevent the engine speed exceeding a preselected value which is a function both of compressor delivery pressure and compressor delivery temperature.

What I claim:

1. A fuel system for a gas turbine engine of the type comprising an air compressor, which fuel system comprises means to supply fuel under pressure to the engine, means for reducing fuel flow when a predetermined engine speed is attained, biasing means rendering said fuel flow reducing means normally inoperative, bias adjusting means, means sensitive to compressor outlet temperature and means sensitive to compressor outlet pressure, means under simultaneous control of said two sensitive means connected to said bias adjusting means to change the action thereof and to overcome said biasing means thus to reduce fuel supply to the engine when the combined output of the means sensitive to compressor outlet temperature and the means sensitive to the compressor outlet pressure tends to exceed a predetermined value.

2. In a fuel system for a gas turbine engine having an air compressor and speed governor means operative to reduce the supply of fuel to the engine to prevent the speed of the engine exceeding a preselected maximum value, said governor means including resilient biasing means rendering said governor normally inoperative and arranged to be overcome at said preselected maximum value of engine speed, in combination, bias adjusting means, means actuated in response to compressor outlet temperature and means actuated in response to compressor outlet pressure to change the bias adjusting means whereby the bias has one fixed value when said temperature and pressure are below preselected values and a second and lower fixed value when the temperature and pressure are above said preselected values thus to render said governor normally operative at one preselected value of engine speed when the said temperature and pressure are below said preselected values and operative at a lower preselected value of engine speed when said temperature and pressure are above said preselected values.

3. In a fuel system for a gas turbine engine having an air compressor and speed governor means operative to reduce the supply of fuel to the engine to prevent the speed of the engine exceeding a preselected maximum value, said governor means including resilient biasing means rendering said governor normally inoperative and arranged to be overcome at said preselected maximum value of engine speed, in combination, fluid pressure responsive servo-means for varying the value of the bias, a supply of pressure fluid to said servo-means, means sensitive to outlet temperature of the compressor and means sensitive to outlet pressure of the compressor to control the pressure of the fluid supplied to said servo-means to cause said means to adjust the bias to have one fixed value when said temperature and pressure are below preselected values and a second fixed value when said temperature and pressure are above said preselected values thus to render said governor operative at one preselected value of engine speed when the temperature and pressure are below said preselected values and operative at a lower preselected value of engine speed when said temperature and pressure are above said preselected values.

4. Speed governor means as claimed in claim 3 wherein said fluid pressure responsive servo-means comprises a differential-area piston slidable in a stepped cylinder between two limiting positions, a connection conveying pressure fluid to the smaller-area side of said piston, a connection containing a flow restrictor conveying said pressure fluid to the larger-area side of the piston, a vent from said larger-area side having an orifice, a valve controlling the area of said orifice and arranged to be actuated by said temperature sensitive device and said pressure sensitive device in the sense to move said valve in the direction to close said orifice on increase of temperature and pressure above said preselected values so that the fluid pressure load on the larger-area side of said piston preponderates and the piston moves to one of its limiting positions to give a first fixed value to the bias, and to move said valve in the direction to open said orifice on decrease of temperature and pressure below said preselected values so that the fluid pressure on the smaller-area side of the piston preponderates to move said piston to the other of its limiting positions to give a second fixed value to the bias.

5. In a fuel system for a gas turbine engine having a variable volumetric capacity pump, a first fluid pressure servo-means controlling the output of the pump and comprising bleed valve means, a diaphragm subjected to a fluid pressure which is a function of the rotational speed of the engine and loaded in opposition by a spring and adapted and arranged to operate said bleed valve means to reduce pump output when said fluid pressure load overcomes said spring load at a preselected value of engine rotational speed, in combination, second fluid pressure servo-means for adjusting the anchorage of said spring comprising a differential-area piston, a cylinder in which said piston works, means connecting said spring to said piston, a first pressure fluid connection from the outlet of said pump to said cylinder to apply fluid pressure directly to the smaller-area side of said piston, a second pressure fluid connection from the outlet of said pump to said cylinder to apply fluid pressure to the larger-area side of said piston, a flow restrictor in the said second fluid connection, a vent from the larger-area side of said cylinder comprising an orifice, a valve member controlling the area of said orifice, means sensitive to compressor outlet temperature and means sensitive to compressor outlet pressure to actuate said valve in the sense of decreasing the orifice area on increase of temperature and pressure above preselected values so that the fluid pressure load on said larger-area side of the piston preponderates and the piston moves to one of its limiting positions to adjust the spring load to have a first value, and in the sense of increasing said orifice area on decrease of temperature and pressure below said preselected values so that the fluid pressure on the smaller-area side of the piston preponderates and said piston is moved to the other of its limiting positions to adjust said spring load to a second and higher value.

6. The system of claim 5 wherein there is a second flow restrictor, the first being between said pump outlet and said orifice and the second being between the larger-area side of the said cylinder and the said orifice.

7. The system of claim 6 in which both said restrictors are in series between the pump outlet and the larger-area side of the said cylinder and the orifice is connected to a point between the restrictors.

References Cited in the file of this patent

UNITED STATES PATENTS

| | | |
|---|---|---|
| 2,422,808 | Stokes | June 24, 1947 |
| 2,429,005 | Watson et al. | Oct. 14, 1947 |
| 2,474,033 | Chamberlin et al. | June 21, 1949 |
| 2,499,232 | Strub | Feb. 28, 1950 |
| 2,691,382 | Frick | Oct. 12, 1954 |
| 2,694,290 | Best | Nov. 16, 1954 |
| 2,697,909 | Chandler | Dec. 28, 1954 |
| 2,808,702 | Dotson | Oct. 8, 1957 |
| 2,809,492 | Arkawy | Oct. 15, 1957 |